Reissued Aug. 4, 1953 Re. 23,697

UNITED STATES PATENT OFFICE 23,697

SPONGE RUBBER COMPOSITION

William R. Stauffer, Dayton, Ohio, assignor to The Commonwealth Engineering Company of Ohio, Dayton, Ohio, a corporation of Ohio No Drawing. Original No. 2,567,950, dated September 18, 1951, Serial No. 32,717, June 12, 1948. Application for reissue September 8, 1952, Serial No. 308,500

3 Claims. (Cl. 260—2.5)

Matter enclosed in heavy brackets [ ] appears in the original patent but forms no part of this reissue specification; matter printed in italics indicates the additions made by reissue.

This application is a continuation-in-part of the application filed in the name of William R. Stauffer, Serial No. 770,109, filed August 22, 1947, and entitled "Method and Apparatus for Making Sponge Rubber" and now abandoned.

This invention relates to a sponge rubber composition.

It is an object of this invention to provide a composition for the manufacture of sponge rubber which composition does not necessitate using solid gasifying substances.

It is another object of this invention to provide a composition for the manufacture of sponge rubber *products* which does not require the use of autoclaves or closed molds.

It is still another object of this invention to provide a rubber foam without the use of heat.

It is another object of the invention to provide a composition useful for making rubber foam at the point desired, for instance within automobile bodies, in railway cars for sound installation and other places of similar character and then vulcanizing the foamed composition in position.

These objects of the invention are accomplished by mixing latex under pressure with other suitable materials, *including a plasticizer*, to form the composition of the invention and releasing the pressure whereby a foam is formed, and then heating said foam to cure and stabilize it. More specifically, these objects of the invention are accomplished by producing a rubber foam by the use of nitrous oxide ($N_2O$). Unexpected results occur from the use of nitrous oxide in that the foaming takes place with a decrease in pressure upon the *fluid* rubber [latex] being impregnated with nitrous oxide; the foam obtained can then be vulcanized, whereby the sponge is obtained.

The addition of albumen to latex facilitates foaming still more and also increases the stability of the foam. It has been found that an amount of 2% albumen with regard to the [latex] *fluid rubber* is the optimal quantity in case a soft sponge is to be produced, while 5% albumen gives better results in the case of a hard sponge. Other foaming agents operative with satisfaction are proteins.

Examples of compounds

The following are typical examples of compounds which I have successfully used.

In the case of neoprene latex, it is necessary to maintain the mixture at 40 to 41° F. This refrigeration effect permits the use of a dormant coagulant or gelling agent, such as sodium silicofluoride ($Na_2SiF_6$) or calcium formate.

I

| | | |
|---|---|---|
| Neoprene latex, an aqueous emulsion of neoprene rubber | gms | 100. |
| Plasticizer, 30–1 (a vegetable oil) | cc | 1. |
| Sensitizer, a 25% dispersion of sodium silicofluoride | cc | 2.3 |

II

| | | |
|---|---|---|
| Natural latex, an aqueous dispersion of natural rubber | cc | 100. |
| Foaming agent, egg albumen | cc | 2.5 |
| Plasticizer, 30–1 | cc | 2.5 |
| Activator, zinc oxide | cc | 2.0 |
| Sensitizer, a 25% dispersion of sodium silicofluoride | cc | 1.0 |

III

| | | |
|---|---|---|
| Natural latex, an aqueous dispersion of natural rubber | cc | 50. |
| Neoprene latex, 140–22087 | cc | 50. |
| Plasticizer, 30–1 | cc | 1. |
| Sensitizer, a 25% dispersion of sodium silicofluoride | cc | 2.3 |

The foregoing mixtures are impregnated in a closed container with nitrous oxide at from 80 to 250 pounds. A pressure of approximately 200 pounds has been found most desirable.

It is desirable to agitate the mixture after impregnation to bring about a thorough and uniform distribution of the gas in the latex.

As soon as the impregnated liquid is released, as through a hose nozzle, it immediately foams. The product so foaming is then subjected to heat of vulcanization either by infrared ray lamp, induction heating or by convection heating. A sponge is formed thereby having a very fine bubble formation with the bubbles of gas interconnected. This gives a very strong and soft sponge of homogeneous character. It can be cast in very thick sections as well as thin sections and constitutes a mass production item which can be continuously produced.

The temperature of vulcanization depends upon the type of rubber, its accelerators, etc. The time of vulcanization likewise varies. The problem involved in its solution is well-known in the rubber industry and needs no description here except that an oven temperature of from 200 to 250° F. has been found satisfactory. The length of time varies greatly.

Henry's law states that the mass of a soluble gas that dissolves in a definite mass of liquid at a given temperature is very nearly directed proportional to the partial pressure of the gas and is valid for gases that do not unite chemically with the solvent. This means that as the pressure increases, the amount of dissolved gas increases proportionally.

Although nitrous oxide is the anhydride of hyponitrous acid, the breakdown of this acid is irreversible. It has therefore been found that nitrous oxide does not chemically combine with water.

Nitrous oxide has been incorporated into natural and synthetic latices and into mixtures *of these fluid rubbers* using pressures of from 100 p. s. i. to 300 p. s. i. A pressure of 80 p. s. i. on the nitrous oxide incorporated less gas than did 100 p. s. i. However, the latices *that is fluid rubbers* may be also converted to foam by simply bubbling nitrous oxide through them under atmospheric pressure.

By way of contrast, carbon dioxide has been tried and found undesirable because carbon dioxide, although considerably more soluble in water than nitrous oxide, reacts with water forming carbonic acid which coagulates latices.

Carbon dioxide under pressure of 100 p. s. i. was bubbled through and incorporated in natural latex confined in a closed vessel. After the latex was saturated with carbon dioxide, it was foamed by letting the carbon dioxide escape from the vessel through a valve.

Under these conditions, the foam contained curds of coagulated latex. Pipes and valves attached to the pressure vessel were coated on the inside and at places almost clogged with this coagulated latex. About one third of the latex charge coagulated in the bomb.

Carbon dioxide dissolves in water under pressure; carbonic acid has little or no effect on either synthetic or natural latices. However, under pressure, this weak acid can react with enough of the sodium hydroxide in synthetic latex or ammonium hydroxide in natural latex to cause coagulation. When carbon dioxide is bubbled through latex, enough of the stabilizing hydroxide is converted to the carbonate to cause coagulation.

This unexpected result with the use of nitrous oxide has indicated that nitrous oxide is the only gas suitable for foaming latices by releasing the pressure required to dissolve the gas in the latex. I have found that this foamed latex, after being injected into the mold and coagulated, can be cured in hot water or with steam or by the application of infrared heat.

Therefore, nitrous oxide is the only common gas which is suitable for producing foamed latex because other common inert gases are too insoluble in the latex.

While natural as well as sypthetic rubbers or their mixtures are applicable for the invention, polychloroprene sold as neoprene, polyvinyl chlorides, polyvinylidene and polybutadiene latices are especially satisfactory. *The polyvinyl chlorides as is known are vinyl esters termed in the trade as "Vinylite" and are members of a class of resinous thermoplastics possessed of rubbery characteristics.*

It will be understood that I desire to comprehend within my invention such modifications as may be necessary to adapt it to varying conditions and uses.

Having fully described my invention what I claim as new and desire to secure by Letters Patent is:

1. A composition for producing sponge rubber comprising an aqueous dispersion of a rubber selected from the group of natural rubber, polychloroprene latex, polyvinyl chloride latex, polybutadiene latices and mixtures thereof, a small amount of a vegetable oil as a plasticizer, from substantially 1 to 2.3 percent of a heat sensitizer selected from the group consisting of sodium silico fluoride and calcium formate, impregnated with nitrous oxide at a pressure of from 80 to 250 lbs., said composition being maintained at approximately 40 to 41° F. and having the property to expand upon release from a container into a rubber foam.

2. The composition of claim 1 in which the aqueous dispersion of rubber is natural rubber latex.

3. *A composition for producing sponge rubber comprising an aqueous dispersion of a mixture comprising polyvinyl chloride, a small amount of vegetable oil as a plasticizer, from substantially 1 to 2.3% of a heat-sensitizer selected from the group consisting of sodium silicofluoride and calcium formate, impregnated with nitrous oxide at a pressure of from 80 to 250 pounds, said composition being maintained at approximately 40° to 41° F. and having the property to expand upon release from a container into a rubber foam.*

WILLIAM R. STAUFFER.

References Cited in the file of this patent or the original patent

UNITED STATES PATENTS

| Number | Name | Date |
|---|---|---|
| 1,746,596 | Knox | Feb. 11, 1930 |
| 1,828,481 | Trobridge et al. | Oct. 20, 1931 |
| 2,126,273 | Ogilby | Aug. 9, 1938 |
| 2,183,857 | Turkington | Dec. 19, 1939 |
| 2,211,429 | Mueller-Cunradi et al. | Aug. 13, 1940 |
| 2,278,441 | Harrison et al. | Apr. 7, 1942 |
| 2,288,190 | Harrison | June 30, 1942 |
| 2,319,675 | Grinter | May 18, 1943 |
| 2,321,111 | Stamberger | June 8, 1943 |
| 2,325,637 | Stewart | Aug. 3, 1943 |
| 2,371,707 | Rainier et al. | Mar. 20, 1945 |
| 2,386,995 | Wigal | Oct. 16, 1945 |